UNITED STATES PATENT OFFICE.

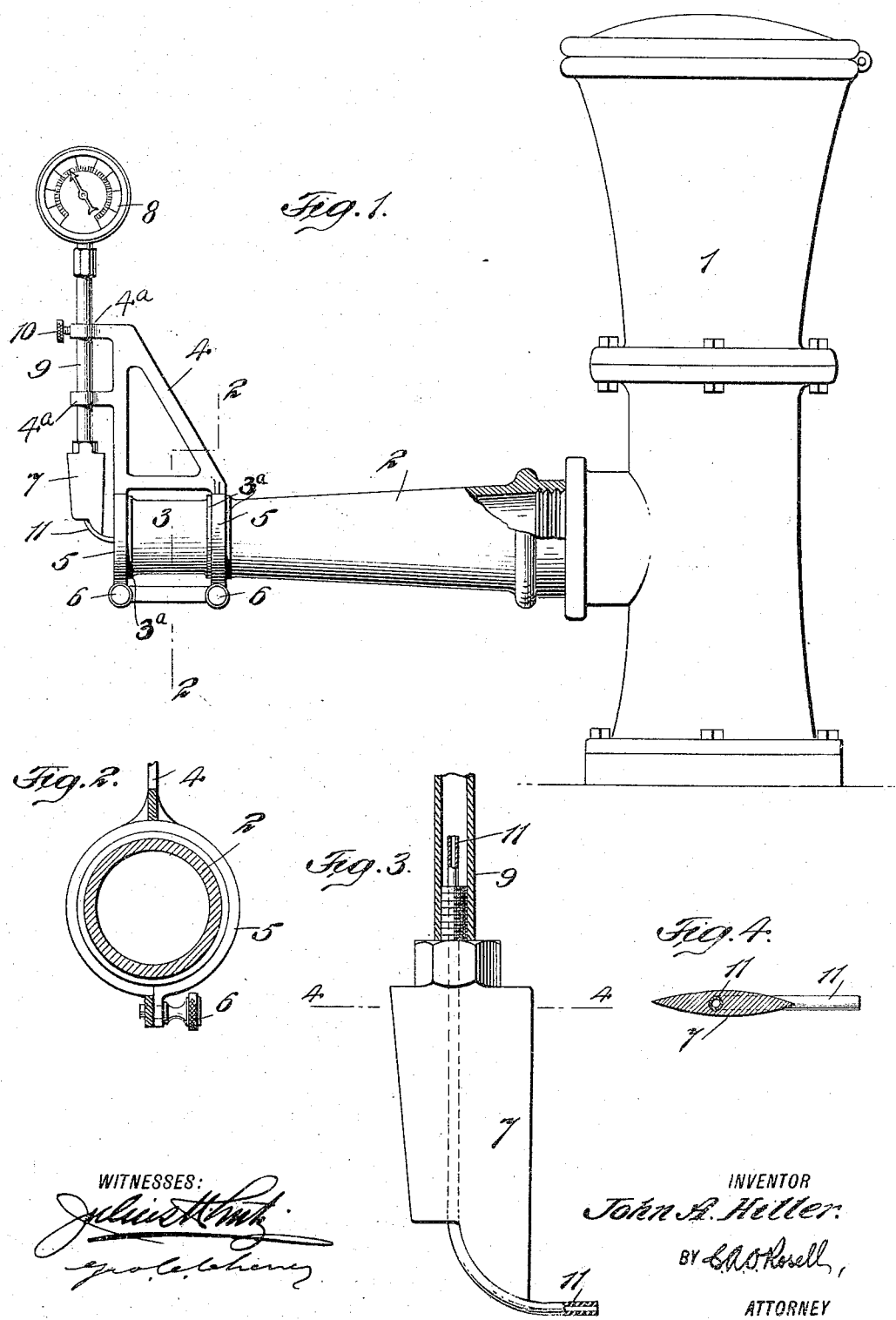

JOHN A. HILLER, OF CINCINNATI, OHIO, ASSIGNOR TO NATIONAL WATER MAIN CLEANING COMPANY, OF NEW YORK, N. Y., A CORPORATION OF MAINE.

DEVICE FOR MEASURING THE FLOW OF WATER.

1,041,470.   Specification of Letters Patent.   Patented Oct. 15, 1912.

Application filed January 21, 1910. Serial No. 539,327.

*To all whom it may concern:*

Be it known that I, JOHN A. HILLER, a citizen of the United States, and a resident of Cincinnati, in the county of Hamilton and State of Ohio, have invented certain new and useful Improvements in Devices for Measuring the Flow of Water, of which the following is a specification.

My invention relates generally to devices for measuring fluid pressures, and has reference to that type of measuring device wherein a Pitot tube, operatively connected with a pressure gage or similar indicating instrument, is employed.

More specifically, the invention relates to the means for attaching the measuring instrument and its Pitot tube connection to the conduit through which the water, of which the pressure is to be measured, flows.

The primary object of the invention is to provide attaching means of this character whereby the Pitot tube may be adjusted both circumferentially and radially in relation to the conduit, so that the induction end of the Pitot tube may be placed at practically any point in the stream or current passing through the conduit thus obtaining readings for every point of the current.

A further object of the invention is to provide a simple form of attaching means, preferably formed integral and having means by which the tube may be removably yet firmly retained in adjusted position, so that the accuracy of the indications will not be jeopardized by accidental displacement of the Pitot tube.

The invention is susceptible of embodiment in numerous forms, the form at present preferred by me being illustrated in the accompanying drawing, wherein—

Figure 1 is an elevation partly in section of the device attached to a fire hydrant. Fig. 2 is a section on line 2—2 of Fig. 1. Fig. 3 is an elevation partly in section of the Pitot tube. Fig. 4 is a section on the line 4—4 of Fig. 3.

Referring to the drawing there is shown a fire hydrant 1, to which is attached a cone 2 terminating at its narrower end in a cylinder 3. Formed on the cylinder 3 are collars 3ª serving to support and guide split rings 5, which are attached to or formed integrally with an upright bracket 4 wherein the Pitot tube and gage, more fully hereinafter referred to, are suspended and adjusted relatively to the cylinder 3. The split rings 5 are clamped in adjusted position by the screws 6. Projecting from the bracket 4, preferably from one end of its lateral edges at substantially right angles to the split rings 5 are guide members or eyes 4ª through which passes a hollow stem or tube 9, carrying a pressure gage 8 and held in place by the set screw 10. The tube 9 may be moved axially in the eyes 4ª and held in its adjusted position by screwing home the set screw 10. To the hollow stem 9 is attached a Pitot tube 7, the portion of which which is placed in operative relation to the outlet end of the cylinder 3 consisting of the narrow bent tube 11.

The device is used as follows:—The cone 2 is first attached to the spout of a fire hydrant, by means of a screw thread or in any other way. The bracket 4 is made to assume a substantially upright position and the gage 8 and Pitot tube 7 are attached. By raising or lowering the tube 9 the horizontal terminal of the Pitot tube is adjusted radially in relation to the cylinder 3 and may be made to assume any radial position in the diameter of the opening of the horizontal tube 3. By rotating the split rings 5 about the cylinder 3, thus setting the tube 9 at any desired angle the horizontal terminal of the tube is adjusted circumferentially in relation to the cylinder 3, and may in like manner be made to assume any position in relation to the circumference of the cylindrical portion 3, and the pressure of the issuing water may be measured at different points from which, and the known diameter of the tube 3, the average pressure and the average flow of water may be calculated. By causing the cone 2 to terminate in a contracted cylinder, air pockets in the issuing water are avoided.

By means of this device the pressure of the issuing water is very easily, quickly, and accurately determined and from the measurement obtained the rate of flow of the issuing water is readily determined by means of tables prepared for the purpose.

The device is inexpensive and of simple construction, not likely to get out of order and is readily attached and detached.

What I claim as new is:

1. In a device of the character described, the combination with a fluid conduit, of a Pitot tube operatively associated therewith, and means whereby said Pitot tube may be adjusted circumferentially in relation to said conduit and retained in such adjusted position.

2. In a device of the character described, the combination with a fluid conduit, of a Pitot tube operatively associated therewith, means for supporting said Pitot tube in relation to said conduit, and means wherein said Pitot tube may be adjusted radially in relation to said conduit and retained at any desired point of such adjustment.

3. In a device of the character described, the combination with a fluid conduit, of a Pitot tube having its induction end normally directed toward the outlet end of said conduit, supporting means for said Pitot tube adjustable circumferentially in relation to said conduit, and means for retaining said supporting means in adjusted position.

4. In a device of the character described, the combination with a fluid conduit, of a Pitot tube having its induction end normally directed toward the outlet end of said conduit, and a support for said Pitot tube, said support being adjustable circumferentially in relation to said conduit and embodying means wherein said Pitot tube may be adjusted radially in relation to said conduit.

5. In a device of the character described, the combination with a fluid conduit, of a Pitot tube having its induction end normally directed toward the outlet end of said conduit, a support for said Pitot tube, said support being adjustable circumferentially in relation to said conduit and embodying means wherein said Pitot tube may be adjusted radially in relation to said conduit, means for retaining the support in adjusted circumferential position, and means for retaining the Pitot tube in adjusted radial position.

6. In a device of the character described, the combination with a fluid conduit, of a bracket having rings embracing said conduit and revoluble thereabout, means on said bracket wherein a Pitot tube may be adjusted radially in relation to said conduit and held in adjusted position, and a Pitot tube ajustable in said means.

7. In a device of the character described, the combination with a fluid conduit, of an upright bracket having rings embracing said conduit and revoluble thereabout, means for clamping the rings about the conduit, eyes projecting from said bracket in a direction at right angles to the rings, a Pitot tube adjustable in said eyes radially of the conduit, and means for retaining said Pitot tube in its adjusted position in said rings.

Signed at Cincinnati in the county of Hamilton and State of Ohio this 15 day of January A. D. 1910.

JOHN A. HILLER.

Witnesses:
T. H. CASSILLY,
GEO. F. WHITNEY.

---

Copies of this patent may be obtained for five cents each, by addressing the "Commissioner of Patents, Washington, D. C."